F. SCHULDER.
SELF CLOSING FAUCET.
APPLICATION FILED SEPT. 20, 1915.

1,270,882.

Patented July 2, 1918.

WITNESS
Geo. E. Krieger.

INVENTOR.
FRED SCHULDER.
BY Fisher Willost
ATTORNEYS.

UNITED STATES PATENT OFFICE.

FRED SCHULDER, OF CLEVELAND, OHIO, ASSIGNOR TO UNITED BRASS MANUFACTURING COMPANY, OF CLEVELAND, OHIO, A PARTNERSHIP COMPOSED OF WM. J. SCHOENBERGER AND BENJAMIN F. KLEIN.

SELF-CLOSING FAUCET.

1,270,882.  Specification of Letters Patent.  Patented July 2, 1918.

Application filed September 20, 1915. Serial No. 51,721.

*To all whom it may concern:*

Be it known that I, FRED SCHULDER, a citizen of the United States, residing at Cleveland, in the county of Cuyahoga and State of Ohio, have invented certain new and useful Improvements in Self-Closing Faucets, of which the following is a specification.

This invention relates to an improvement in self-closing faucets, and the improvement involves the use of trunnion rollers interposed between two members of the faucet, and also, the employment of a single stamping of sheet metal formed in a particular way to separate the rollers and to secure them so that the device may be readily assembled and disassembled, all substantially as herein shown and described and more particularly pointed out in the claims.

Figure 1:
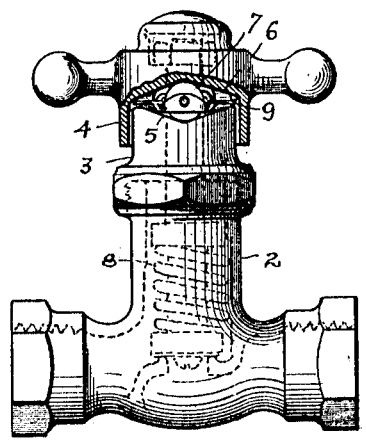
Figure 2:
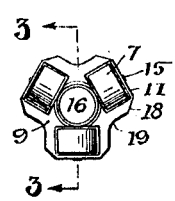
Figure 3:
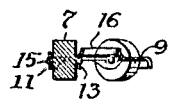
Figure 4:
Figure 5:
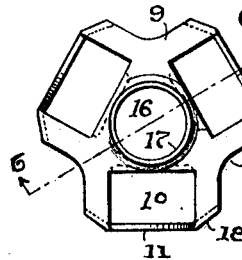
Figure 6:
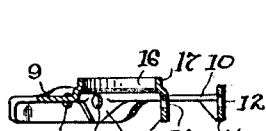
Figure 7:
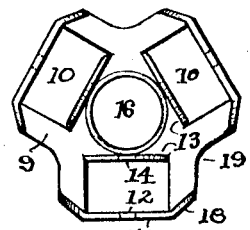
Figure 8:
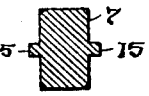
Figure 9:
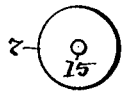

In the accompanying drawings, Figure 1 is a side elevation, partly in section, of a self-closing faucet embodying my improvement. Fig. 2 is a plan view, full size, of the rollers and retainer used in said faucet. Fig. 3 is a sectional view on line 3—3, of Fig. 2, and Fig. 4 is a side view thereof. Fig. 5 is an enlarged view of the sheet metal retainer with the rollers removed, and Fig. 6 is a cross section on line 6—6, Fig. 5. Fig. 7 is a bottom view of Fig. 5. Figs. 8 and 9 are section and side views of one of the solid rollers.

The invention is shown in Fig. 1 as incorporated in a self-closing faucet 2, having a bonnet 3 surrounded by a rotatable handle 4, the upper and bottom surfaces of the bonnet and handle being provided with reversely-inclined bearing surfaces 5 and 6, respectively, for the rollers 7 interposed therebetween. Three rollers 7 are used at equi-distant points radially of the valve stem to raise the valve against the tension of a strong spring 8, shown in dotted lines Fig. 1, but as the working space for the rollers is limited, rollers having shorter axes than their diameters are preferably used. Moreover, as the pressure of the spring 8 is relatively great under maximum tension the use of solid or trunnion rollers is exceedingly desirable to avoid breakage. It is advantageous also to secure the rollers in a suitable retainer 9, and particularly in such a way that all the rollers may be jointly handled with the retainer when assembling and disassembling the faucet, and also so that each roller may be easily removed and replaced in the retainer. For these reasons I make the retainer 9 of sheet metal, preferably brass having spring properties and form three rectangular openings 10 at equidistant points radially in the body thereof, and also form the outer portion of the body opposite each opening 10 downwardly into a flange 11 at right angles. In forming the openings 10 part of the stock is retained to round the upper edge of flange 11 and to project the same above the plane of the body, thereby permitting a round aperture 12 to be formed in the flange substantially in the same plane as the body. A second downwardly-projecting flange 13 is also produced paralleling flange 11 but at the opposite side of opening 10. Flange 13 is also provided with an aperture 14 correspondingly located to that of aperture 12, and the rollers 7 have trunnions 15 at each side adapted to be loosely confined in said apertures, and also to be detachably engaged with the flanges 11 and 13 which possess sufficient spring to be flexed to one side for that purpose. The central portion of the body of the retainer is punched out at its center to provide a round flanged opening 16 which is of larger diameter in the plane of the body than is the flange portion 17 thereof, thereby affording clearance between the valve stem and the downwardly-projecting flanges 13 and guarding against contact of the roller trunnion ends with the valve stem. The inclines 5 on the bonnet 3 must also be cleared by the outer flanges 11 of the retainer, and therefore the end portions 18 of said flanges are rounded or tapered and formed at an angle to the main face thereof, and the retainer body is also cut out or serrated at 19 between the flanged portions 18 to provide clearance and non-interference with the crest portions of the inclines.

Tapering the end portions 18 of the flanges 11 strengthens the flange and the retainer body, thus safe-guarding accidental displacement of the rollers from the retainer.

A substitute for the solid roller having integral trunnions, would be a roller having a solid pin driven or inmovably affixed therein and projected on opposite sides thereof. Openings 10 are shown as rectangular, but this form of opening could be made otherwise, particularly where the roller was of different form than here shown.

What I claim is:

1. Two members rotatably and reciprocally related having opposed radially disposed undulating inclines, in combination with a set of trunnioned rollers interposed between said inclines, and a retainer having opposite bearings for said trunnions and flat serrated connecting portions to provide clearance and prevent interference with the crest portions of the undulating inclines.

2. In a device as described two members having opposed circular undulating inclines, a set of solid rollers having short integral trunnions on opposite sides thereof, and a flexible retainer for said rollers having holes in which said trunnions are engaged.

3. In a device as described, two members having opposed circular undulating inclines and a valve stem extending centrally therethrough, a set of rollers having trunnions interposed between said members and a sheet-metal plate having openings radially therein to accommodate said rollers and provided with apertured flexible flanges at the sides of said openings to detachably engage the roller trunnions, the plate being provided with a round flanged opening centrally thereof spacing the flanges and trunnions apart from the valve stem.

4. In a device described, two members having opposed circular undulating inclines, a valve stem extending centrally through said members, a set of trunnion rollers interposed between said inclines and a roller retainer having a flanged opening centrally and a series of openings equi-distant radially therein and flexible apertured flanges at opposite sides of said radial openings in which said rollers are detachably engaged, said flanges having sloping end portions to clear the crests of the said undulating inclines.

5. In a device substantially as described, a set of solid rollers having trunnions, and a removable retainer for said rollers comprising a spring sheet-metal body having a series of rectangular openings at equi-distant points radially to accommodate said rollers and a central opening with an encircling flange, and said body being flexible intermediate said openings and having the opposite edge portions of said radial openings bent at substantially right angles and provided with holes to receive and hold the trunnions of said rollers.

6. An article of manufacture and sale comprising a stamped sheet metal body having flexible portions radially thereof provided with bearings constructed to retain solid or trunnion rollers and adapted to operate between two rotary bearing surfaces having opposed undulating inclines.

7. An article of manufacture and sale, comprising a thin sheet metal body having a central round opening and a series of openings at equi-distant points radially thereof and said body having parallel apertured flanges formed at the inner and outer sides respectively of said radial openings and the space between said flanges in flat formation and reduced to provide flexibility in the body at the ends of said radial openings.

8. An article of manufacture and sale, comprising a sheet metal body having a central round opening and flexible portions provided with a series of substantially rectangular openings at equi-distant points radially thereof and said body having parallel flanges formed at the inner and outer sides of said radial openings and the outer flanges bent at substantially right angles to the plane of the body and having a reinforcing corner at each end thereof, in combination with rollers having trunnions engaged in said flanges.

In testimony whereof I affix my signature in presence of a witness.

FRED SCHULDER.

Witness:
R. B. MOSER.